Jan. 16, 1940.   J. LA M. BRIGHT   2,187,675
WHEELED GARDEN IMPLEMENT
Filed July 5, 1939
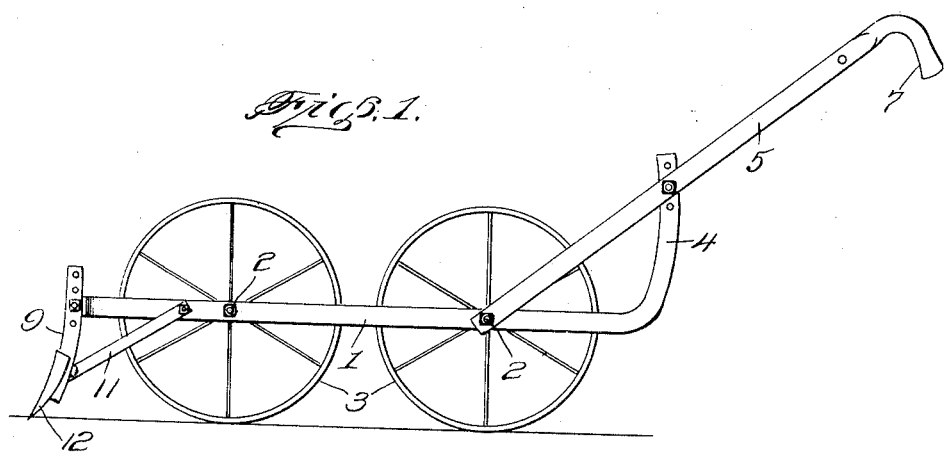
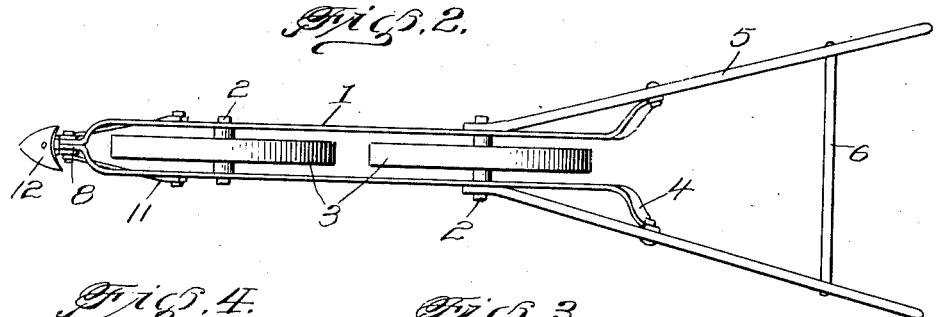
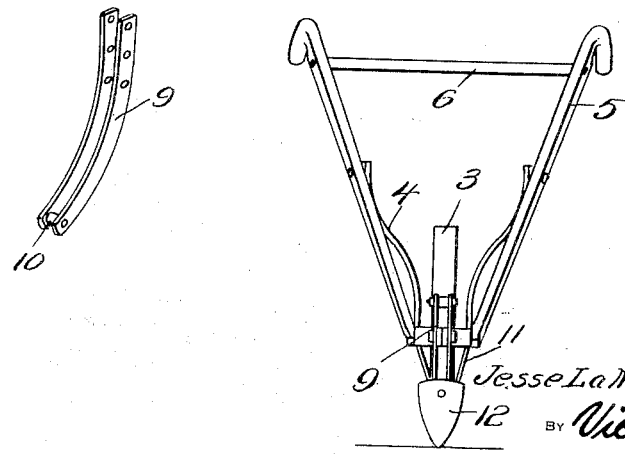
Jesse LaMont Bright, INVENTOR
BY Victor J. Evans & Co.
ATTORNEYS Patented Jan. 16, 1940

2,187,675

UNITED STATES PATENT OFFICE 2,187,675

WHEELED GARDEN IMPLEMENT

Jesse La Mont Bright, Riverton, Iowa

Application July 5, 1939, Serial No. 282,900

1 Claim. (Cl. 97—59)

This invention relates to cultivators, and its general object is to provide a hand operated wheeled garden plow and cultivator having its ground working elements disposed at the extreme forward end thereof, thus making it possible to easily and expeditiously work the soil in close proximity to growing crops of all kinds, without damaging the same as distinguished from cultivators of the type now in general use, in which the ground working elements are disposed rearwardly of a supporting wheel, thereby rendering the same practically useless for properly cultivating vines, bushes, shrubbery and the like, due to the fact that the soil cannot be worked close to the plants without the supporting wheel damaging the same, even when extreme care is taken on the part of the operator.

A further object is to provide a cultivator and plow that includes a pair of supporting or ground engaging wheels disposed in alignment, one in advance of the other, which tends to make the cultivator easy to push, as well as assures complete cultivation, in that the wheels tend to retain the ground working elements at a uniform depth within the soil at all times.

Another object is to provide a hand operated wheeled garden implement and plow, that is simple in construction, inexpensive to manufacture and extremely efficient in operation, use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a side elevation of the implement which forms the subject matter of the present invention.

Figure 2 is a top plan view thereof.

Figure 3 is a front elevation.

Figure 4 is a detail perspective view of the shank for attachment of the ground or soil working elements to the implement.

Referring to the drawing in detail, it will be noted that the beam frame is made up of a pair of strip members 1 disposed in spaced parallel relation for the major portion of their length and provided with pairs of openings in their parallel portions, in which are mounted axles 2 having journaled thereon between the parallel portions, supporting or ground engaging wheels 3 of the same diameter, in the form shown, and for disposal in alignment, one in advance of the other, for supporting the beam frame with its parallel portions in a true horizontal plane, so that the ground or soil working elements will be disposed a uniform depth within the ground during the travel of the implement, as will be apparent upon inspection of Figure 1.

The strip members 1 are bent to provide upwardly directed arcuate rear portions 4 disposed in diverging relation with respect to each other from the parallel portions and being provided with a plurality of openings for receiving the bolts of bolt and nut connections for adjustably securing handles 5 between their ends to the upper ends of the rear portions, the handles being provided with a bridging member 6 and formed with substantially right angled bent upper ends to provide hand grips 7, while the lower ends of the handles are secured to the ends of the rear axle, as best shown in Figure 2.

The forward ends of the strip members 1 from the parallel portions are curved toward each other and terminate in forwardly directed end portions 8 disposed in engagement with each other to receive the shank frame for the ground working elements. The shank frame is made up of a pair of spaced arcuate strip members 9 straddling the end portions 8 and having a plurality of openings along the length thereof to receive the bolt of a bolt and nut connection for adjustably securing the shank frame to the beam frame at the extreme forward end thereof for disposing the ground working implements accordingly, as will be apparent upon inspection of Figures 1 and 2.

Secured to and bridging the lower ends of the strip members 9, is a cross member 10 for cooperation with the end portions 8 for holding the strip members 9 spaced a uniform distance from each other throughout their length, and bracing members 11 are provided for the shank frame, for disposal at an angle between the parallel portions and the lower end of the shank frame, as best shown in Figure 1.

While I have illustrated a shovel type ground working element 12 detachably secured to the shank frame for adjustment thereon, it will of course be understood that any type of ground working element can be used, including a rake, hilling and turning lay type and weeders.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A wheeled garden implement comprising a beam frame including spaced parallel portions, upwardly directed rear portions extending in diverging relation with respect to each other from the parallel portions, forwardly directed end portions formed on the parallel portions, a shank frame adjustably secured to the forwardly directed end portions and including spaced arcuate strip members straddling the forwardly directed end portions, a ground working implement secured to the shank frame, bracing means for the shank frame and secured thereto and to the parallel portions, axles mounted in and bridging the spaced parallel portions, aligned ground engaging supporting wheels journaled on the axles for disposal between the parallel portions one in advance of the other and rearwardly of the shank frame, and handles for the implement and secured to and rising at a rearward inclination from the rear axle and being adjustably secured to the upper ends of the upwardly directed portions.

JESSE LA MONT BRIGHT.